United States Patent [19]

Kato et al.

[11] Patent Number: 4,861,610
[45] Date of Patent: Aug. 29, 1989

[54] PROCESS FOR PREPARING EMULSIFIED FAT COMPOSITION CONTAINING CHEESE

[75] Inventors: Masaaki Kato; Katumi Shinohara; Hiromu Sugiyama, all of Tokyo, Japan

[73] Assignee: Asahi Denka Kogyo Kabushiki Kaisha, Tokyo, Japan

[21] Appl. No.: 167,357

[22] Filed: Mar. 14, 1988

[30] Foreign Application Priority Data

Mar. 27, 1987 [JP] Japan .................................. 62-73855

[51] Int. Cl.$^4$ .......................... A23C 19/00; A23D 5/00
[52] U.S. Cl. .................................... 426/582; 426/602; 426/604
[58] Field of Search ................. 426/582, 602, 604, 61

[56] References Cited

U.S. PATENT DOCUMENTS

| | | | |
|---|---|---|---|
| 3,899,605 | 8/1975 | Schaap | 426/582 |
| 3,940,423 | 2/1976 | Eibl et al. | 426/604 |
| 4,034,124 | 7/1977 | van Dam | 426/603 |
| 4,547,387 | 10/1985 | Todt et al. | 426/602 |
| 4,684,533 | 8/1987 | Kratochvil | 426/576 |

*Primary Examiner*—Steve Alvo
*Attorney, Agent, or Firm*—Frishauf, Holtz, Goodman & Woodward

[57] ABSTRACT

An oil-in-water type emulsified fat composition which contains cheese and shows stable emulsification can be prepared by adding 0.1 to 5% by weight, based on the fat, of monoacyl glycero phospholipid(s) as at least an emulsifier component and 0.5 to 5% by weight, based on the cheese, of molten salt(s) in the emulsification of cheese, fat and water.

9 Claims, No Drawings

PROCESS FOR PREPARING EMULSIFIED FAT COMPOSITION CONTAINING CHEESE

BACKGROUND OF THE INVENTION
1. Field of the Invention:

This invention relates to a process for preparing an emulsified fat composition. More particularly, it relates to a process for preparing an oil-in-water type emulsified fat composition which contains cheese and is suitable for incorporation and folding into foods.

2. Description of the Prior Art:

Cheese is obtained by combining some materials selected from among milk, cream, skim milk or partially defatted milk, butter milk and those obtained by processing them together, coagulating the resulting mixture and removing whey therefrom. There are more than 400 varieties of cheese including fresh and ripened ones each having characteristic flavor and properties depending on the raw materials and processing method.

Because of the high nutritive value and excellent flavor, attempts have been made to blend cheese into other food materials in the fields of, for example, confectionery, baking and cooking. However it is difficult to incorporate cheese per se in food materials since it is hardly mixed, dispersed or emulsified and causes some troubles such as an thickening, separation or roping upon heating. Thus common processes for imparting a cheese to a food product include adding a cheese flavor or applying a cheese spread thereto (cf. Japanese Patent Laid-Open No. 158050/1981). An example of a process for incorporating cheese per se into food materials comprises heating an oil-in-water type emulsified fat composition comprising cheese, fat, starch, water and a gum and then molding the heated composition to thereby give an emulsified fat composition containing cheese (cf. Japanese Patent Laid-Open No. 166345/1986). However this process is accompanied by some disadvantages such that the emulsified fat composition containing cheese, which is obtained by adding fat to cheese and stabilizing the emulsion with starch and gum, is rough to the touch because of the insufficiently dissolved protein in the cheese and a gelatinous and poor texture caused by the starch and gum. In addition, the oil-in-water type emulsified fat composition thus obtained is not so stable as to withstand so-called high-temperature short-time pasteurization. Thus it should be pasteurized at a temperature lower than 100° C. and molded, which makes the shelf stability of the emulsified fat composition containing cheese poor.

We have previously provided a cheese composition having a smooth texture, a high availability and an excellent shelf stability (cf. Japanese Patent Application No. 269065/1985). It has a specific composition, i.e., having a ratio of the total moisture content to the total fat content ranging from 30 : 70 to 65 : 35 and prepared under specific heating conditions, i.e., at a temperature of 110° to 150° C. for two seconds to four minutes.

SUMMARY OF THE INVENTION

It is an object of the present invention to provide a process for preparing an oil-in-water type emulsified fat composition containing cheese which is stable regardless of the composition and heating conditions, has a smooth texture and is highly suitable for the incorporation or folding into food materials.

Further it is another object of the present invention to provide a process for preparing a smooth oil-in-water type emulsified fat composition containing cheese which shows stable emulsification upon high-temperature short-time pasteurization or when adding common salt thereto to thereby improve the shelf stability and is suitable not only for incorporation but also for folding into foods.

According to the present invention, the above objects can be achieved by a process for preparing an emulsified fat composition which comprises adding 0.1 to 5% by weight, based on the fat, of mono acyl glycerol phospholipid(s) as at least one emulsifier component and 0.5 to 5% by weight, based on cheese, of molten salt(s) in the emulsification of cheese, fat and water to thereby give an oil-in-water type emulsified fat composition.

DETAILED DESCRIPTION OF THE INVENTION

In the present invention, either natural or process cheese may be used so long as it is obtained by coagulating milk and/or dairy product(s) and removing whey therefrom. When a process cheese which already contains molten salt(s) is to be used, the amount of the molten salt(s) to be newly added may be lowered to thereby adjust the total content of the molten salt(s) to 0.5 to 5% by weight based on the cheese. When a composition having a low viscosity is to be prepared, it is preferable to employ a cheese treated with a protease.

The fat to be used in the present invention is not strictly limited so long as it is commonly used as a vegetable or animal edible fat. Examples thereof include palm oil, beef tallow, coconut oil, corn oil, rapeseed oil, milk fat, and those obtained by hardening or fractionating them. In order to achieve a stable flavor, fractionated soft fat or hydrogenated fat obtained from vegetable oils are preferable. Further those having a denseness appropriate in the incorporation or folding in are particularly preferable.

Any drinking water may be used in the present invention.

The content of said cheese and fat in the composition is not strictly limited. Namely the emulsification may be effected at any ratio. However a content of cheese less than 10% by weight can hardly give the characteristic cheese flavor. On the other hand, a content of fat less than 20% by weight can hardly give a laminated folded-in structure. Therefore it is preferable to employ 10 to 75% by weight, still preferably 20 to 65 % by weight, of cheese and 20 to 85% by weight, still preferably 30 to 75% by weight, of fat.

The molten salt(s) are used in the present invention in order to solubilize protein contained in the cheese. Thus those commonly used in, for example, the preparation of a process cheese may be employed therefor. The molten salt(s) are used in an amount of 0.5 to 5% by weight based on the cheese. In order to fully exert the effects of the present invention, it is necessary to solubilize the protein contained in the cheese. An amount of the molten salt(s) less than 0.5% by weight can not give the desired effect, while that exceeding 5% by weight might damage the taste. As described above, when a process cheese which already contains molten salt(s) to be used as the cheese, the amount of the molten salt(s) to be newly added is adjusted to thereby given the total content thereof of 0.5 to 5% by weight based on the cheese. Examples of the molten salts include citrates and phosphates. Among these salts, sodium citrate, sodium tripolyphosphate and sodium tetrapolyphosphate are particularly preferable.

The fatty acid of the mono acyl glycero phospholipid(s) (i.e., lyso phosphatide(s)), used ad the essential component of the emulsifier in the present invention, are preferably those having eight or more carbon atoms. In each mono acyl glycero phospholipid, the acyl group may be located in either α- or β-position. As the mono acyl glycero phospholipid(s), both of natural ones of L-form and synthetic racemates may be used.

It is known that natural mono acyl glycero phospholipid(s) are present in living organisms together with diacyl glycero phospholipid(s) in, for example, lipids of cereals such as soybean, rapeseed, corn or wheat and of animal cells. Mono acyl glycero phospholipid(s) may be further produced by hydrolyzing diacyl glycero phospholipids present in animal lipids such as yolk or vegetable lipids such as soybean with phospholipase A-2 obtained from swine pancreatic juice or snake venoms or phospholipase A-1 obtained from bacteria; removing the fatty acids thus formed with, for example, acetone; and purifying the residue by, for example, silica gel chromatography, if required (cf. Japanese Patent Laid-Open No. 13263/1971, No. 136966/1977 and No. 51853/1983). In this case, the mono acyl glycero phospholipid(s) thus obtained may be hydrogenated in an appropriate solvent in the presence of a catalyst such as nickel to thereby give a surfactant of a higher oxidation stability.

It is described in J. Amer. Oil Chem. Soc., 886-888, Oct. 1981 that mono acyl glycero phospholipid(s) of various compositions can be obtained by changing the conditions under which the phospholipase A-2 is employed.

Alternately mono acyl glycero phospholipid(s) can be obtained from materials prepared by fractionating diacyl glycero phospholipids with the use of a solvent such as ethyl alcohol. Further methods for preparing phosphatidylcholine such as the one with the use of yolk (cf. J. Biol. Chem., 188, 471-476 (1951)) as well as those as described in Japanese Patent Publication No. 16/1985, No. 42655/1984, No. 123496/1982 and No. 23997/1981 can be applied to the present invention. Every natural mono acyl glycero phospholipid as mentioned above has a levo-rotatory optical activity and is turned out to be safe when orally administered to animals (cf. J. Sci. Food and Agr., 32, 451-458).

The glycero phospholipid(s) to be used in the present invention can be analyzed by, for example, thin layer chromatography, TLC-FID analyser (Iatro Scan method) or high-performance liquid chromatography.

It is preferable that the mono acyl glycero phospholipid(s) (a) to be used in the present invention, which can be obtained by the methods as described above, substantially comprise lyso phosphatidylcholine (i.e. mono acyl phosphatidylcholine). The mono acyl glycero phospholipid(s) (a) may further contain lyso phosphatidylethanolamine and a small amount of one or more mono acyl glycero phospholipid(s) selected from among lyso phosphatidylinositol, lyso phosphatidic acid and lyso phosphatidylserine. The mono acyl glycero phospholipid(s) (a) prepared from natural materials often contain diacyl phosphatide(s) (b) corresponding to the mono acyl glycero phospholipid(s) (a) depending on the employed preparation processes. In such a case, it is preferable that the content of the mono acyl glycero phospholipid(s) (a) is 40% by weight or above, preferably 50% by weight or above, based on the total glycero phospholipids, i.e., (a)+(b).

Mono acyl glycero phospholipid(s) of a relatively high purity may be used together with crude soybean phospholipid(s) containing oily component(s). In this case, it is preferable that the mono acyl glycero phospholipid(s) are dispersed in an aqueous phase while the crude soybean phospholipids are dispersed in an oily phase.

As described above, the emulsifier(s) to be used in the present invention comprise mono acyl glycero phospholipid(s) as an essential component. Preferable examples of emulsifiers to be used therewith include polyglycerol fatty acid esters, sucrose fatty acid esters, sorbitol fatty acid esters and glycerol fatty acid monoesters. With the use of these esters, the objects of the present invention can be achieved at a relatively low cost.

Examples of the polyglycerol fatty acid esters to be preferably used in the present invention together with the mono acyl glycero phospholipid(s) are mono, di- or polyesters of polyglycerols having a degree of polymerization of 4 to 10 with saturated and/or unsaturated fatty acids having 14 to 22 carbon atoms and mixtures thereof. Polyglycerol fatty acid esters of fatty acids having 13 or less carbon atoms would exhibit a bitter taste, while those of fatty acids having 23 or more carbon atoms are hardly available in general.

Examples of the sucrose fatty acid esters to be preferably used in the present invention together with the mono acyl glycero phospholipid(s) are mono-, di- or polyesters of sucrose with saturated and/or unsaturated fatty acids having 12 to 22 carbon atoms and mixtures thereof. Sucrose fatty acid esters of fatty acids having 11 or less carbon atoms would exhibit only limited emulsifying effects, while those of fatty acids having 23 or more carbon atoms are hardly available in general.

Examples of the sorbitol fatty acid esters to be preferably used in the present invention together with the mono acyl glycero phospholipid(s) are mono-, di- or polyesters or sorbitol, sorbitan or sorbide with saturated and/or unsaturated fatty acids having 12 to 22 carbon atoms and mixtures thereof. Sorbitol fatty acid esters of fatty acids having 11 or less carbon atoms would exhibit only limited emulsifying effects, while those of fatty acids having 23 or more carbon atoms are hardly available in general.

Examples of the glycerol fatty acid monoesters to be preferably used in the present invention together with the mono acyl glycero phospholipid(s) are monoesters of glycerol with unsaturated and/or unsaturated fatty acids having 12 to 22 carbon atoms and mixtures mainly comprising the monoesters together with a small amount of di- and/or triesters. Glycerol fatty acid monoesters of fatty acids having 11 or less carbon atoms would exhibit only limited emulsifying effects, while those of fatty acids having 23 or more carbon atoms are hardly available in general.

It is preferable that the emulsifier composition to be used in the present invention comprises the mono acyl glycero phospholipid(s) and polyglycerol fatty acid ester(s), sucrose fatty ;acid ester(s) or sorbitol fatty acid ester(s) in a weight ratio of 30:70 to 100:0; or the mono acyl glycero phospholipid(s) and glycerol fatty acid monoester(s) at a weight ratio of 50:50 to 100:0. When the amount of the mono acyl glycero phospholipid(s) is smaller, the effects of the present invention are not enough.

The mono acyl glycero phospholipid(s) are used in an amount of 0.1 to 5% by weight based on the fat or oil. When they are less than 0.1% by weight, the effects of the present invention can not be achieved.

The addition of the same in an amount exceeding 5% by weight is disadvantageous from the economical viewpoint since it brings about no change in the effects and sometimes alters the taste.

Generally speaking, the required amount of the mono acyl glycero phospholipid(s) would decrease with an increase in the purity of the same.

When the above emulsifier(s) are to be used together with the mono acyl glycero phospholipid(s), the total amount of the emulsifier mixture is 0.1 to 5% by weight based on the fat or oil. The addition of the same in an amount exceeding 5% by weight is disadvantageous from the economical viewpoint since it brings about no change in the effects and sometimes alters the taste.

In the process of the present invention, other surfactants may be further added as emulsifiers without departing from the scope thereof.

With the use of said mono acyl glycero phospholipid(s) as at least an emulsifier component, a stable emulsion containing a large amount of protein can be obtained. Thus the resulting emulsified composition containing a large amount of cheese sustains stable emulsification even at a high temperature exceeding 100° C. or when adding a large amount of common salt thereto. Accordingly it can be subjected to high-temperature short-time pasteurization or contain a high concentration of common salt to thereby improve its shelf stability. Namely, in the present invention, common salt may be added to the oil-in-water type emulsion in an amount of 5 to 30% by weight based on the moisture, including that contained in the cheese, therein.

In addition to the essential components such as cheese, fat, water, mono acyl glycero phospholipid(s) and molten salt(s), the emulsified fat composition of the present invention may further contain the abovementioned common salt as well as various food additives, for example, perfumes, seasonings, spices, sugars, vitamins, soluble proteins and peptides within the scope of the present invention. Furthermore it may contain, for example, starch materials, gums and preservatives, though it is preferable not to add these materials thereto.

The emulsified fat composition of the present invention may be prepared in the following manner.

Mono acyl glycero phospholipid(s) are dissolved or dispersed optionally with other emulsifier(s). If required, in an aqueous phase or fat. It is preferable that hydrophilic emulsifier(s) and lipophilic ones are dissolved or dispersed in an aqueous phase and in fat, respectively. Then molten salt(s) and cheese are added to the aqueous phase optionally together with other additives such as common salt. The aqueous phase is then heated to 60° C. or above to thereby dissolve the cheese and other materials. Subsequently the fat is added to the aqueous phase and the obtained mixture is emulsified in an appropriate manner, for example, with a homomixer by stirring at a high rate, with a pressure homogenizer or a colloid mill, by ultrasonic treatment or a combination thereof to thereby give an oil-in-water type emulsion. The emulsion thus obtained may be provided as the final product as such. Alternately it may be further subjected to hightemperature short-time pasteurization and then provided as the final product. The high-temperature short-time pasteurization may be preferably carried out by treating said oil-in-water type emulsion at a temperature of 110° to 150° C. for two seconds to four minutes.

After the high-temperature short-time pasteurization, the emulsion may be further homogenized under sterile conditions to thereby give the final product. In this case, the sterile homogenization may be effected in a conventional manner.

To further illustrate the present invention, and not by way of limitation, the following Examples will be given.

The term "glycero phospholipid" as used hereinbelow refers to a glycero phospholipid containing mono acyl glycero phospholipid and diacyl glycero phospholipid as main components.

EXAMPLE 1

Glycero phospholipids containing 70% of phosphatidylcholine were obtained from commercially available soybean phospholipids through precipitation with acetone and fractionation with aqueous ethanol. The glycero phospholipids were reacted with phospholipase A-2 obtained from swine pancreatic juice (Lecithase 10 L, a product of Novo). The fatty acids thus formed were removed with acetone and the residue was fractionated with an alcohol. After further fractionating with the use of a silicic acid column and an alcohol, glycero phospholipids containing 95% of lyso phosphatidylcholine and 2% of lyso phosphatidylethanolamine, i.e., 97% of mono acyl glycero phospholipids in total, were obtained.

0.6 kg of the glycero phospholipids were dissolved in 6.8 kg of water and 0.3 kg of sodium citrate, 0.3 kg of sodium tripolyphosphate, 2.0 kg of common salt and 30 kg of Gouda cheese were added thereto. The resulting mixture was heated to 60° C. to thereby dissolve the cheese and then 60 kg of milk fat was further added thereto. The mixture thus obtained was emulsified at 60° C. in a homomixer (mfd. by Tokushu Kika Kogyo Co., Ltd.) at 15,000 rpm for ten minutes to thereby give an oil-in-water type emulsion containing the cheese, i.e., the emulsified fat composition of the present invention. This emulsion had a rich Gouda cheese flavor and a smooth texture. This emulsion was stored in a thermostat while periodically changing the temperature, i.e., 20° C. for 12 hours and 35° C. for 12 hours. As a result, the emulsion was still homogeneous and smooth after two months without showing separation of any oily phase, moisture leakage or putrefaction. With the use of this emulsion, a cheese puff pastry of the following composition was prepared by way of trial in the following manner. As a result, the puff pastry showed an excellent spreadability and lifting and had a rich cheese flavor.

| Composition of cheese puff pastry: | parts |
|---|---|
| hard flour | 50 |
| soft flour | 50 |
| common salt | 0.5 |
| water | 52 |
| shortening | 5 |
| Preparation method: | |
| Dough mixing: | 2 min at a low rate and 5 min at a high rate. |
| Content of folded-in oil-in-water type emulsified fat composition containing cheese: | 70% based on the flour. |
| Folding: | In four, four times. |
| Molding: | Sheet out to give a thickness of 2 mm followed by rapping. |

| | |
|---|---|
| Baking: | 200° C. for 15 min. |

EXAMPLE 2

Defatted phospholipids, which were obtained from soybean phospholipids through precipitation with acetone, were reacted with Lecithase 10 L. Then glycero phospholipids were extracted from the reaction mixture with a mixture of isopropyl alcohol and hexane and treated with acetone to thereby defat the same. After extracting the defatted product with an alcohol, glycero phospholipids containing a large amount of mono acyl glycero phospholipids were obtained. The obtained glycero phospholipids contained mainly 48% of lyso phosphatidylcholine and 11% of lyso phosphatidylethanolamine and 62% of mono acyl glycero phospholipids in total.

10 kg of these glycero phospholipids were dissolved in 150 kg of water and 10 kg of sodium citrate, 10 kg of sodium tetrapolyphosphate and 900 kg of Cheddar cheese were further added thereto. The resulting mixture was heated to 60° C. to thereby dissolve the cheese and 920 kg of hardened palm olein having an elevated melting point of 36° C. was added thereto. Then the mixture thus obtained was emulsified with a homomixer (mfd. by Tokushu Kika Kogyo Co., Ltd.) at 60' C. and 15,000 rpm for ten minutes. Subsequently the emulsion thus obtained was treated with a Contherm scrapper UHT sterilizer (mfd. by Alfa-Laval) at 130° C. for ten seconds and then immediately homogenized sterilely under a homogenization pressure of 50 kg/cm². Then it was cooled at 40° C. with a cooler and sterilely packed in a container to thereby give an oil-in-water type emulsion containing the cheese, i.e., the emulsified fat composition of the present invention. This emulsion had a rich Cheddar cheese flavor and a smooth texture. This emulsion was stored without taking off the seal in a thermostat while periodically changing the temperature, i.e., 20° C. for 12 hours and 35° C. for 12 hours. As a result, the emulsion was still homogeneous and smooth after two months without showing separation of any oily phase, moisture leakage or putrefaction. With the use of this emulsion, a cheese puff pastry of the same composition as the one described in Example 1 was prepared by way of trial in the same manner as the one described in Example 1. As a result, the puff pastry showed an excellent spreadability and lifting and had a rich cheese flavor.

EXAMPLE 3

4 kg of the glycero phospholipids as obtained in Example 2 were dissolved in 812 kg of water and 8 kg of sodium citrate, 8 kg of sodium tripolyphosphate and 800 kg of Gouda cheese were added thereto. The resulting mixture was heated to 60° C. to thereby dissolve the cheese. Then 368 kg of palm olein was further added thereto and the mixture thus obtained was emulsified by stirring with a propeller mixer at 200 rpm for 15 minutes at 60° C. Then the obtained emulsion was treated with a Contherm scrapper UHT sterilizer (mfd. by Alfa-Laval) at 145° C. for five seconds. Subsequently the emulsion was cooled to 40° C. with aa cooler and sterilely packed in a container to thereby give an oil-in-water type emulsion containing the cheese, i.e., the emulsified fat composition of the present invention. This emulsion was smooth and flowable and had a rich Gouda cheese flavor. This emulsion was stored without taking off the seal in a thermostat while periodically changing the temperature, i.e., 20° C. for 12 hours and 35° C. for 12 hours. As a result, the emulsion was still homogeneous and smooth after two months without showing separation of any oily phase, creaming up, thickening or putrefaction. With the use of this emulsion, a sponge cake of the following composition was prepared by way of trial. As a result, the emulsion showed a high workability and the obtained sponge cake was excellent in voluminousness and cheese flavor.

| Composition of cake: | part |
|---|---|
| soft wheat flour | 100 |
| baking powder | 0.8 |
| whole egg | 130 |
| sugar | 110 |
| foaming oil | 35 |
| O/W emulsion containing cheese | 50 |

EXAMPLE 4

4 kg of the glycero phospholipids as obtained in Example 2 were dissolved in 674 kg of water and 8 kg of sodium citrate, 8 kg of sodium tetrapolyphosphate and 800 kg of Gouda cheese were added thereto. The resulting mixture was heated to 60° C. to thereby dissolve the cheese and then 506 kg of butter oil was further added thereto. The obtained mixture was emulsified by stirring with a propeller mixer at 150 rpm for 15 minutes at 60° C. Then the obtained emulsion was heated, cooled and packed in the same manner as the one described in Example 3. Thus an oil-in-water type emulsion containing the cheese, i.e., the emulsified fat composition of the present invention was obtained. This emulsion was smooth and flowable and had a rich Gouda cheese flavor. With the use of this emulsion, a preservation test and trial preparation of a sponge cake were effected each in the same manner as the one described in Example 3. The results thus obtained were comparable to those of Example 3.

EXAMPLES 5 TO 8

The procedure of Example 1 was followed except that the glycero phospholipids were replaced with an emulsifier mixture comprising the glycero phospholipids as used in Example 1 and SY Greaster at a ratio of 5/5 (by weight; the same will apply hereinafter) (Example 5); that comprising the glycero phospholipids as used in Example 1 and SE-S 1670 at a ratio of 5/5 (Example 6); that comprising the glycero phospholipids as used in Example 1 and Emusol S-10-F at a ratio of 7/3 (Example 7); and that comprising the glycero phospholipids as used in Example 1 and Emulsy MS at a ratio of 7/3 (Example 8), to thereby give each an oil-in-water type emulsion containing cheese, i.e., the emulsified fat composition of the present invention, the Emusol S-10-F and Emulsy MS were dissolved in fat prior to the use.

In Examples 5 to 8, each oil-in-water type emulsion containing cheese thus obtained had a rich Gouda cheese flavor and a smooth texture. With the use of this emulsion, a preservation test and trial preparation of a cheese puff pastry were effected each in the same manner as the one described in Example 1. The results thus obtained were comparable to those of Example 1.

The emulsifiers used together with the glycero phospholipids in Examples 5 to 8 are as follows:

SY Greaster MS-500 : mfd. by Sakamoto Yakuhin Co., Ltd. hexaglycerol monostearate, HLB 11.6;

SE-S 1670 : mfd. by Mitsubishi Kasei Shokuhin Co., Ltd. sucrose monostearate, HLB 15 ;

Emulsol S-10-F : mfd. by Kao Soap Co., Ltd. sorbitol monostearate, HLB 4.7 ; and Emulsy MS : mfd. by Riken Vitamin Co., Ltd. glycerol monostearate, HLB 2.5.

EXAMPLES 9 to 12

The procedure of Example 3 was followed except that the glycero phospholipids were replaced with an emulsifier mixture comprising the glycero phospholipids as used in Example 2 and SY Greaster MS 500 at a ratio of 5/5 (Example 9) ; that comprising the glycero phospholipids as used in Example 2 and SE-S1670 at a ratio of 5/5 (Example 10) ; that comprising the glycero phospholipids as used in Example 2 and Emusol S-10-F at a ratio of 7/3 (Example 11) ; and that comprising the glycero phospholipids as used in Example 2 and Emulsy MS at a ratio of 7/3 (Example 12) to thereby give each an oil-in-water type emulsion containing cheese, i.e., the emulsified fat composition of the present invention. The Emusol S-10-F and Emulsy MS were dissolved in fat prior to the use.

In Example 9 to 12, each oil-in-water type emulsion containing cheese thus obtained was smooth and flowable and had a rich Gouda cheese flavor. With the use of this emulsion, a preservation test and trial preparation of a cake were carried out each in the same manner as the one described in Example 3. The results thus obtained were comparable to those of Example 3.

The following Table shows the cheese content, fat content, moisture content and total fat to total moisture ratio of each emulsion as prepared in Examples 1 to 12 as well as the state thereof at 5° C.

| Ex. No. | 1, 5, 6, 7, 8 | 2 | 3, 9, 10, 11, 12 | 4 |
| --- | --- | --- | --- | --- |
| Cheese content | 30% | 45% | 40% | 40% |
| Fat content | 60% | 46% | 18.4% | 25.3% |
| Moisture content | 6.8% | 7.5% | 40.6% | 33.7% |
| Total fat/ total moisture | 78/22 | 71/29 | 34/66 | 42/58 |
| State at 5° C. | homogeneous and smooth hard paste. | homogeneous and smooth hard paste. | homogeneous, smooth and flowable (viscosity: 5000 CP). | homogeneous, smooth and flowable (viscosity: 8500 CP). |

The total fat to total moisture ratio represents the ratio of the total fat to the total moisture contained in the emulsion including those contained in the cheese.

The viscosity was determined with a Rion No. 1 rotor.

COMPARATIVE EXAMPLE 1

The procedure of Example 1 was followed except no glycero phospholipid was added. As a result, the fat separated out and the mixture could not be emulsified.

COMPARATIVE EXAMPLES 2 TO 5

The procedure of Example 1 was followed except that the glycero phospholipids were replaced with SY Greaster (Comparative Example 2) ; SE-S 1670 (Comparative Example 3) ; Emusol S-10-F (Comparative Example 4) ; and Emulsy MS (Comparative Example 5). In each case, the fat separated out and the mixture could not be emulsified.

COMPARATIVE EXAMPLE 6

The procedure of Example 3 was followed except that no glycero phospholipid was added to thereby give an oil-in-water type emulsion containing cheese. Although this emulsion was homogeneous and flowable, it was somewhat rough to the touch in the mouth. This emulsion was subjected to the same preservation test as the one described in Example 3. As a result, no putrefaction was observed after two months. However its viscosity increased with the lapse of time. Further it showed water leakage after 15 days and solidified after a month.

COMPARATIVE EXAMPLE 7

The procedure of Example 4 was followed except that no glycero phospholipid was added to thereby give an oil-in-water type emulsion containing cheese. Although this emulsion was homogeneous and flowable and had a smooth texture, its viscosity increased with the lapse of time. Further it showed water leakage and solidified after 20 days.

COMPARATIVE EXAMPLES 8 TO 11

The procedure of Example 3 was followed except that the glycero phospholipids were replaced with SY Greaster MS-500 (Comparative Example 8) ; SES 1670 (Comparative Example 9) ; Emusol S-10-F f(Comparative Example 10) ; and Emulsy MS (Comparative Example 11). In Comparative Examples 8 and 9, oil-in-water type emulsions containing cheese were obtained, while the mixtures of Comparative Examples 10 and 11 could not be emulsified. Both emulsions of Comparative Examples 8 and 9 were homogeneous and flowable, though their viscosities were higher than that of the emulsion as obtained in Example 3. However each comparative emulsion was rough to the touch in the mouth. When subjected to the same preservation test as the one described in Example 3, it showed an increase in viscosity and water leakage and solidified.

What is claimed is:

1. A process for preparing an emulsified fat composition containing cheese without adding gums which comprises mixing a fat, 0.1 to 5% by weight, based on the fat, of phospholipid containing at least 40% by weight of a mono acyl glycero phospholipid as an emulsifier component, 10–75% by weight cheese and 0.5 to 5% by weight, based on cheese, of molten salt in the emulsification of cheese, fat and water to thereby give an oil-in-water type emulsified fat composition containing cheese; and heating said emulsified fat composition containing cheese to a temperature of 110° to 150° C.

2. A process for preparing an emulsified fat composition as set forth in claim 1, which contains 20 to 85% by weight of fat.

3. A process for preparing an emulsified fat composition as set forth in claim 1, wherein said oil-in-water type emulsion is heated for two seconds to four minutes.

4. A process for preparing an emulsified fat composition as set forth in claim 3, wherein said oil-in-water type emulsion is further sterilely homogenized after said heating.

5. A process for preparing an emulsified fat composition as set forth in claim 1, wherein 5 to 30% by weight, based on the water contained in said oil-in-water type emulsion including that contained in the cheese, of common salt is added.

6. A process for preparing an emulsified fat composition as set forth in claim 1, wherein said molten salt is selected from the group consisting of sodium citrate, sodium tetrapolyphosphate and sodium tripolyphosphate.

7. A process for preparing an emulsified fat composition as set forth in claim 1, wherein said monoacylglycero phospholipid substantially comprises lyso phosphatidylcholine; and said phospholipid further comprises di acyl phosphatide.

8. A process for preparing an emulsified fat composition as set forth in claim 1, wherein the emulsifier component further comprises one or more emulsifiers selected from among polyglycerol fatty acid esters, sucrose fatty acid esters and sorbitol fatty acid esters.

9. A process for preparing an emulsified fat composition as set forth in claim 1, wherein the emulsifier component further comprises a mixture of mono acyl glycero phospholipid and glycerol fatty acid monoester.

* * * * *